United States Patent [19]

Uchiyama

[11] Patent Number: 4,690,278

[45] Date of Patent: Sep. 1, 1987

[54] CASSETTE TAPE HOLDER

[75] Inventor: Yuki Uchiyama, Tokyo, Japan

[73] Assignee: Sakai & Co., Ltd., Japan

[21] Appl. No.: 874,889

[22] Filed: Jun. 16, 1986

Related U.S. Application Data

[63] Continuation of Ser. No. 735,325, May 17, 1985, abandoned.

[30] Foreign Application Priority Data

May 18, 1984 [JP] Japan ............................ 59-072947[U]
May 18, 1984 [JP] Japan ................................ 59-020119

[51] Int. Cl.⁴ ............................................. A47B 81/06
[52] U.S. Cl. ....................................... 206/387; 312/17; 312/18
[58] Field of Search .................... 206/387; 312/17, 18, 312/13, 14, 15

[56] References Cited

U.S. PATENT DOCUMENTS

| | | | |
|---|---|---|---|
| 3,603,478 | 9/1971 | Connan | 206/387 |
| 3,811,745 | 5/1974 | Cylke | 206/387 |
| 3,904,259 | 9/1975 | Hoffmann et al. | 206/387 |
| 3,969,007 | 7/1976 | Lowry | 206/387 |
| 4,162,112 | 7/1979 | Konkler | 206/387 |
| 4,270,817 | 6/1981 | McRae | 206/387 |
| 4,399,912 | 8/1983 | Mollen et al. | |

FOREIGN PATENT DOCUMENTS

| | | | |
|---|---|---|---|
| 126205 | 3/1983 | European Pat. Off. | 206/387 |
| 2135657 | 9/1984 | United Kingdom | 206/387 |

Primary Examiner—Joseph Man-Fu Moy
Attorney, Agent, or Firm—Harness, Dickey & Pierce

[57] ABSTRACT

There is disclosed herein a holder for audio cassette recording tapes which is designed to provide convenient and compact storage for a plurality of cassette tapes and to also enable easy retrieval of same for the purpose of playing same. The cassette holder may be sized to accommodate any desired number of cassettes and includes a plurality of side by side channels into which the cassettes may be easily slid and thereafter supported. A latching member is associated with each of the channels and operates to lock the cassette within. In order to facilitate removal of a cassette from the holder each channel has associated therewith a spring loaded grasping member which upon release of the latching member moves the cassette partially outwardly of the holder whereby an individual may easily grasp and remove the cassette from the holder. In order to prevent inadvertent complete ejection of the cassette, the grasping member also includes arms frictionally engageable with the cassette.

11 Claims, 7 Drawing Figures

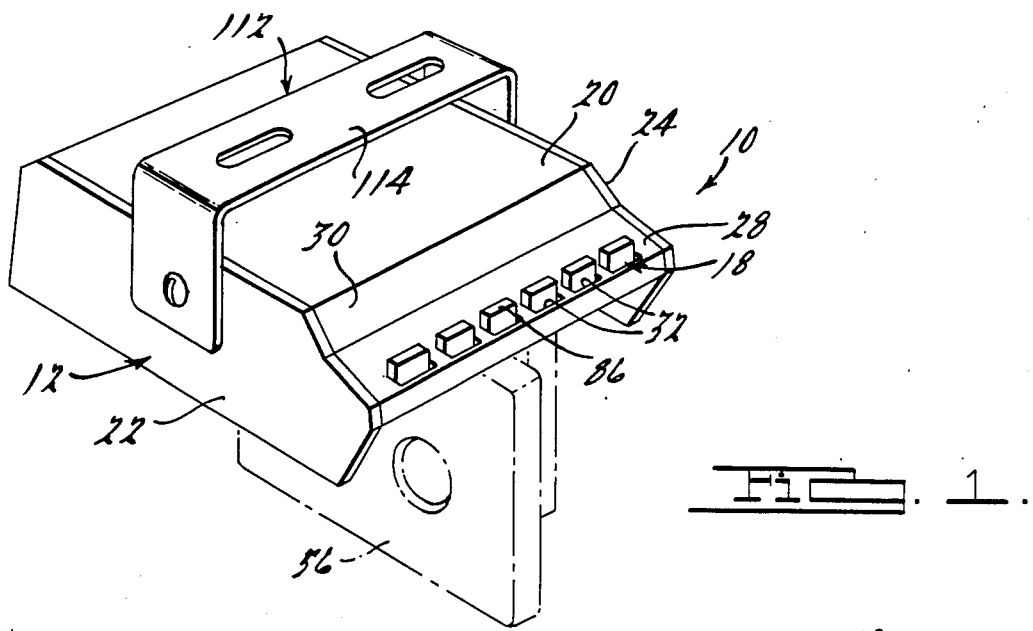
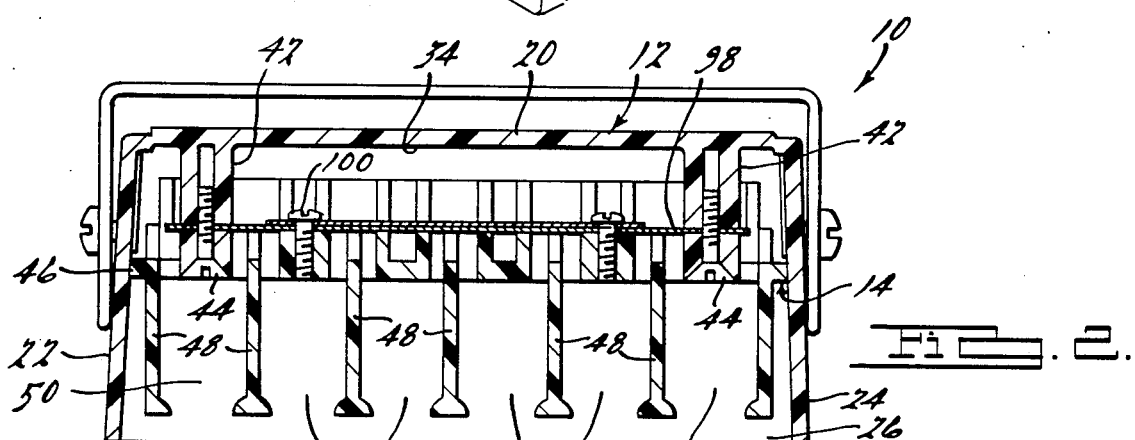
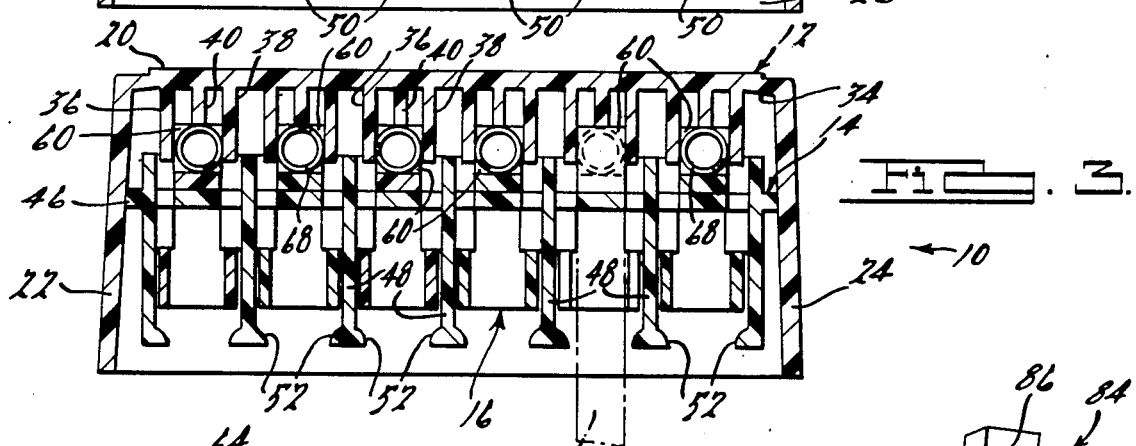
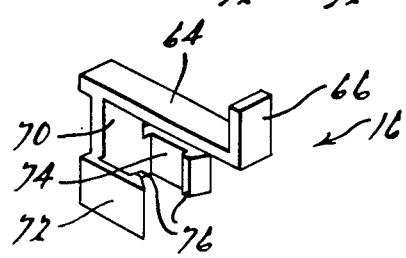
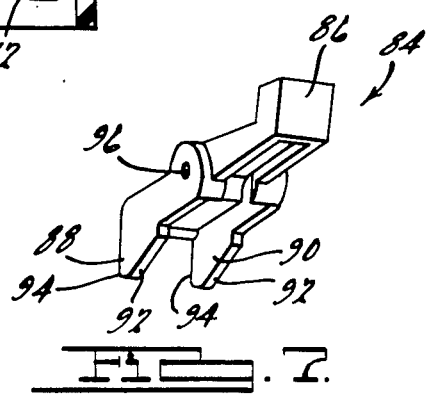

CASSETTE TAPE HOLDER

This is a continuation of U.S. patent application Ser. No. 735,325, filed May 17, 1985 now abandoned.

BACKGROUND AND SUMMARY OF THE INVENTION

The present invention relates generally to storage devices for storing of cassette recording tapes and more particularly to such a storage device which is well suited to be secured within a motor vehicle and offers easy retrieval of such cassettes.

Audio reproduction systems have been increasingly utilizing cassette tapes as a storage medium from which prerecorded sounds are reproduced. Such cassette players as they are commonly referred to have become extremely popular for use in both home as well as in motor vehicles with the result that individuals utilizing such equipment acquire a substantial number of prerecorded audio cassette tapes.

Numerous devices have been designed and manufactured for use in storing of these cassettes, most of which are in the form of boxes, which may or may not be partitioned and may or may not contain covers therefor. Whiel such storage devices may be well suited for the home use, they are not particularly well suited for use in motor vehicles where space limitations as well as vehicle movement presents more restrictive storage problems. Further, with most of these devices, retrieval of the cassette from the storage apparatus is diffcult particularly if the device is filled to capacity. Generally, in order to retrieve such cassettes, it is necessary to grasp opposite sides thereof. However, this is often very difficult to do because of interference from immediately adjacent cassettes. This retrieval process is even more difficult when simultaneously attempting to operate a motor vehicle. Also, in colder climates where gloves are commonly worn it may become impossible to retrieve a cassette from such device without removal of same.

The present invention overcomes these disadvantages by providing an extremely compact storage device particularly designed for storage of audio cassettes and which is well suited for use in a motor vehicle. The apparatus includes pushbutton, spring-loaded retrieval means whereby retrieval of a stored cassette may be easily and conveniently accomplished with little, if any, interference with the simultaneous operation of a motor vehicle. Further, the storage apparatus is very compact in size and may thus be easily mounted in any convenient relatively out-of-the-way location such as suspended below the dashboard or a motor vehicle. Suitably designed tracks are provided which are designed to receive the cassettes and support them in suspended relationship from the storge device with the exposed recording tape being fully protected by the surrounding housing. A spring-biased pushbutton acts as a lock device to retain the cassette within the storage device during operation of the vehicle and prevents accidental dislodgement thereof. A pair of grasping fingers are also provided which frictionally engage opposite sides of the cassette and operate to prevent the cassette from being fully ejected upon release of the pushbuttom lock. These grasping fingers are also spring-loaded and operate to advance the cassette outwardly along the guide rails a sufficient distance so as to enable easy grasping of and removal of a desired cassette. The present invention incorporates relatively few parts and may thus be easily and inexpensively manufactured and assembled and yet provides a convenient, easy-to-use compact storage apparatus for audio cassettes.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of an audio cassette tape holder in accordance with the present invention.

FIG. 2 is a section view of the casette holder of Figure 1, the section being taken along line 2—2 thereof as shown in FIG. 4.

FIG. 3 is a section view similar to that of FIG. 2 but taken along line 3—3 of FIG. 4 and illustrating a cassette tape in phantom.

FIG. 6 is a detailed perspective view of the ejection member incorporated in the present invention.

FIG. 7 is a perspective view of the pushbutton locking member incorporated in the present invention.

DETAILED DESCRIPTION OF THE PREFERRED EMBODIMENT

Figure 4:
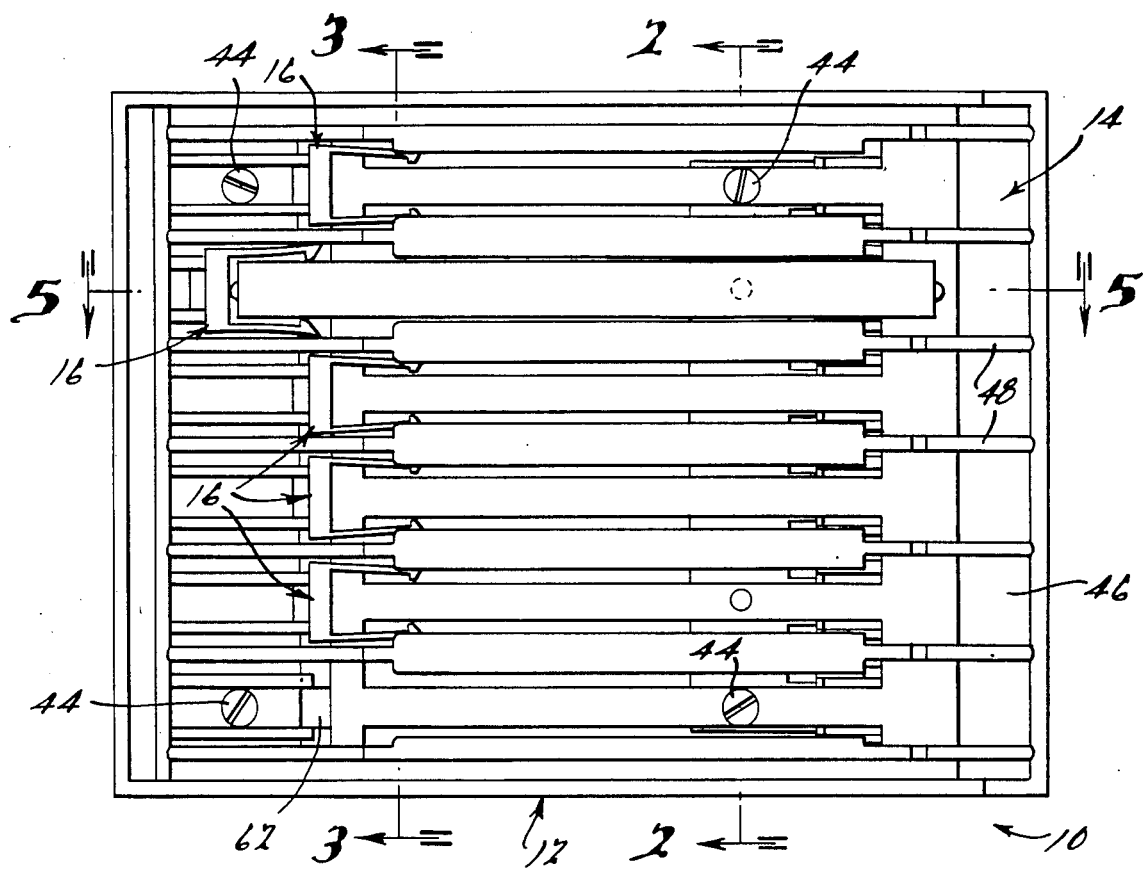
FIG. 4 is a bottom view of the cassette holder of FIG. 1 with portions thereof deleted.

Referring now to the drawings and in particular to FIG. 1, there is illustrated a cassette holder in accordnace with the present invention being indicated generally at 10. Cassette holder 10 comprises an outer housing 12 within which is secured a cassette supporting and retaining frame assembly 14 which includes a plurality of movable cassette grasping members 16 and a cassette locking assembly 18.

Housing 12 compirses a generally rectangular shaped top wall 20 from which a pair of generally parallel spaced elongated integrally formed sidewalls 22, 24 depend. An integrally formed end wall 26 also depends from top wall 20 and interconnects corresponding ends of sidewalls 22, 24. Top wall 20 includes a depressed or lowered front portion 28 extending between sidewalls 22, 24 and interconnected with the other part of the top wall 20 by means of an inclined wall portion 30. A series of spaced openings 32 are provided in aligned relationship along front portion 28. The inner surface 34 of top wall 20 is also provided with a plurality of integrally formed depending guide flange portions positioned in side by side generally parallel relationship and extending generally parallel to sidewalls 22, 24. Guide flange portions are preferably arranged in groups of three consisting of two wide flanges 36, 38 with a relatively narrow flange 40 interposes therebetween. Flanges 36, 38 and 40 operate in guide movement of grasping members 16 as well as to aid in retaining them in assembled relationship. Also, a plurality of spaced fastener receiving posts 42 depend from the inner surface 34 of top wall 20 and are adapted to receive suitable fasteners 44 for securing frame assembly 14 within housing 12.

Frame assembly 14 compriss a generally rectangular shaped flange member 46 from which a plurality of elongated spaced generally parallel flange members 48 depend so as to define a plurality of side by side elongated cassette receiving channels 50. Suitable protrusions 52 are formed along the lower edge of each of-flange members 48 and project inwardly from both sides of the respective channels 50. Protrusions 52 are designed to underengage a shoulder 54 typically provided on standard cassettes 56 in the area surrounding the tape access opening provided therein. Preferably, the spacing between the respective depending flange members 48 as well as the distance between the protrusions 52 and the lower surface of flange member 46 will be such as to provide a slight clearance between the respective surfaces and a cassette inserted therein whereby the cassette may easily be slid along and supported by the surfaces of the protrusions 52.

An upstanding wall portion 58 extends transversely across flange portion 46 adjacent the rear edge thereof and defines a plurality of side by side spring seats 60 positioned slightly above the upper surface of flange member 46. Suitable openings 62 are provided immediately below each of the spring seats 60 which openings are designed to movably accommodate a leg portion 64 of respective ones of the cassette grasping members 16.

Each of the grasping members 16 are substantially identical and accordingly only one such member will be described in detail. As best seen with reference to FIG. 6, grasping member 16 comprises a generally L-shaped leg portion 64 which is designed to be supported on and slid along upper surface of flange member 46. Upwardly (as shown) projecting flange portion 66 is designed to act as a seat against which one end of a compression spring 68 acts, the other end thereof bearing against spring seat 60 so as to thus bias grasping member 16 forwardly or toward the front of flange member 46. Adjacent the opposite end of leg portion 64 is a depending flange portion 70 which supports a pair of spaced forwardly projecting spring arms 72, 74. Preferably, the ends of spring arms 72, 74 will be provided with slight inwardly projecting protrusions 76 which are adapted to grasp and frictionally releasably hold opposite sides of a cassette 56. Preferably, spring arms 72, 74 will be sufficiently resilient so as to be spread outwardly slightly as a cassette is inserted therebetween so as to exert a slight frictional retaining force thereon.

Adjacent the forward end of flange member 46, a plurality of spaced parallel longitudinally extending flange members 78 are provided, each of which is formed with a slot 80 extending inwardly from the upper edge thereof. Slot 80 is designed to accommodate an elongated rod or wire hinge member 82 for pivotably supporting a plurality of locking members 84 forming a portion of the locking assembly 18.

Each of the lockng members 84 is substantially identical and accordingly only one such member will be described in detail. As best seen with reference to FIG. 7, each of the locking members 84 comprise an irregularly shaped member generally as shown which includes an upwardly (as shown) projecting portion 86 which is adapted to protrude upwardly through one of the openings 32 provided in housing 12 so as to act as a pushbutton for release of the cassette locking mechanism 18. The opposite end of locking members 84 is provided with a pair of spaced flange members 88, 90 having an inclined forward edge or ramp surface 92 and a generally planar back stop edge surface 94 positioned at an acute included angle with respect to the forward edge portion. These flange portions 88, 90 are designed to project through suitably positioned openings in flange member 46 into the cassette receiving channels 50 provided thereon. A through bore 96 is provided intermediate the ends of locking member and accommodates hinge rod member 80 so as to pivotably support the locking member 84 on the frame assembly.

Figure 5:
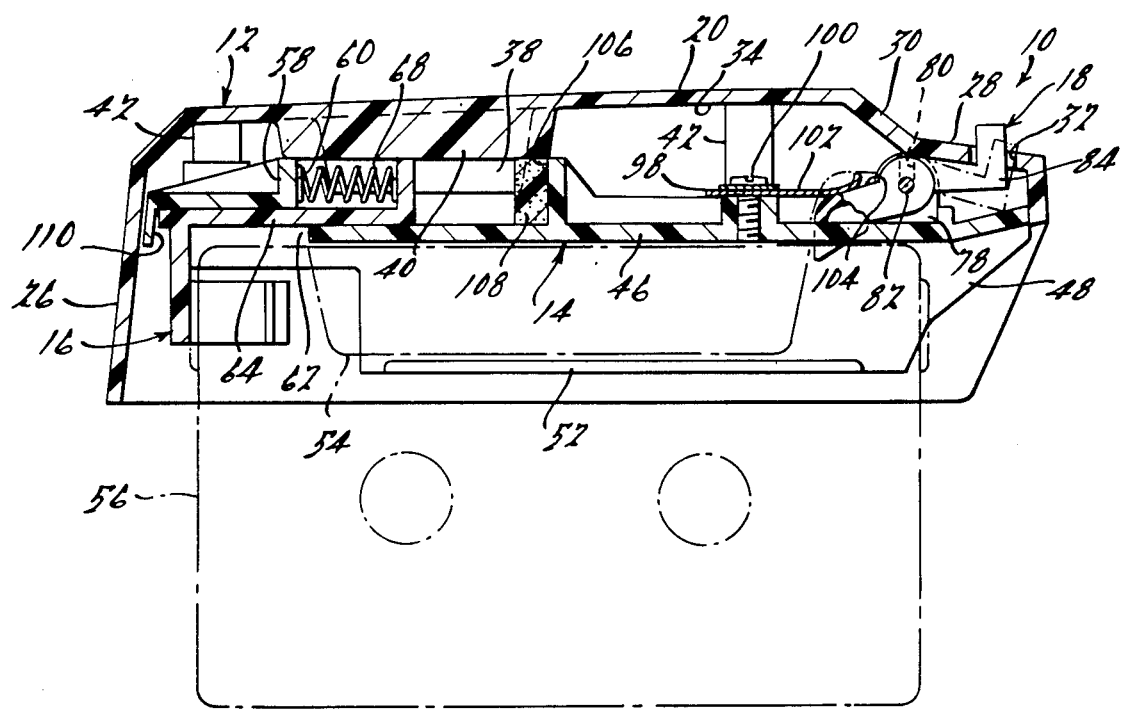
FIG. 5 is a section view of the present invention also showing a cassette in phantom in the retained position therein, the section being taken along line 5—5 of FIG. 4.

As best seen with reference to FIGS. 2 and 5, locking assembly 18 also includes a transversely extending leaf spring member 98 which includes an elongated main body portion secured to flange member 46 by suitable fasteners 100 and from which a plurality of resilient spring fingers 102 projects forwardly into overlying engaging relationship with a planar upper surface portion 104 of respective ones of the locking members 84. Thus, as shown, each of the spring fingers 102 will operate to resiliently bias a respective one of the locking members 84 into a position generally as shown in FIG. 5 wherein flange portions 88, 90 will project into the cassette receiving channel 50.

In order to cushin and aid in limiting forward movement of grapsing member 16, an additional upstanding abutment 106 is provided on flange member 46 intermediate the ends thereof. A suitable shock absorbent pad 108 such as for example a felt or foam rubber pad may be secured thereto and cooperate with flange portion 66 of grasping member 16 to avoid possible complete ejection of the cassette upon release of the locking mechanism. Additionally, another stop surface 110 is provided at or adjacent to the inner end of flange portion 46 and is designed to cooperate with the inner end of leg 64 of grasping member 16 so as to limit inward movement thereof as a cassette is inserted whereby potentially damaging full compression of spring 68 may be avoided. It should also be noted that as best seen with reference to FIG. 3, flanges 36 and 38 operate to restrain lateral movement of spring 68 whereas flange 40 operates to restrain upward movement thereof. Thus, flanges 36, 38, and 40 all cooperate to retain spring 68 in operative assembled relationship as well as to guide longitudinal movement of grasping member 16.

A mounting bracket 112 is also included which includes a central portion 114 which includes suitable fastener receiving openings for securing same to a suitable portion of a motor vehicle. A pair of arms 116, 118 are also provided which may be secured to opposite sidewalls 22, 24 of housing 12 so as to thereby support cassette holder 10 within a suitable position within a motor vehicle.

In order to insert a cassette 56 into the cassette holder 10, the cassette is first positioned in alignment with one of the cassette receiving channels 50 and with the tape access opening provided thereon facggn upwardly. Thereafter the cassette is merely slid inwardly with the shoulders 54 thereof riding along and being supported by opposed protrusions 52 provided on depending flange portions 40. As the cassette 56 is moved inwardly into the housing, the leading edges of the cassette shoulders 54 will engage the ramp surfaces 92 of the locking members 84 thereby pivoting locking member 84 about rod 82 and moving flanges 88 and 90 upwardly as the cassette passes underneath. The inner end of the cassette will then engage and move between the fingers 74 of the movable grasping member 16 and cause the grasping member 16 to slide rearwardly thereby compressing spring 68. Once the cassette has been moved inwardly a sufficient distance, stop surfaces 94 of flanges 88, 90 will drop back into the cassette receiving cavity 50 under the influence of biasing spring finger 102. Thereafter stop surfaces 94 will engage the shoulder portions 54 of opposite sides of the cassette thereby retaining the cassette securely within the holder 10.

In order to release a particular stored cassette 56, a user need merely depress a selected one of the buttons 86 whereupon spring 68 acting against grasping member 16 will cause the cassette 56t o be moved forwardly so as to project outwardly of the cassette holder 10 whereupon the user may easily grasp the cassette 56 and remove same. Because the grasping fingers 72, 74 of the grasping member 16 will be frictionally engaging opposite sides of the cassette, the possibility of the cassette being fully ejected from the holder is effectively eliminated. It should also be noted that the cassettes are retained by the holder of the present invention with the tape access opening thereof fully disposed within the housing thus preventing the possibility of damage to the tape itself. Also, because the cassette holder of the present invention is designed to move a selected cassette forwardly for easy removal, the spacing between the cassettes may be relatively small thus allowing a large number of cassettes to be easily stored within a relatively small space. Further, the cassette holder is designed to be easily fabricated from suitable polymeric compositions and easily assembled with a minimum number of separate parts being required.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A cassette tape holder comprising:
   a housing;
   a frame secured within said housing, said frame including means defining a plurality of elongated channels in side by side relationship, each of said channels being sized to receive a cassette tape, said defining means including means engageable with said cassette to support same;
   grasping means associated with each of said channels and movably supported on said frame, each of said grasping means including opposed arm members positioned within said channel and operative to frictionally grasp opposite lateral edges of said cassette; and
   releasable latching means associated with each of said channels and supported on said frame, said releasable latching means including a portion projecting into said channel and engageable with said cassette to lock said cassette within said channel;
   said grasping means being operative to inhibit ejection of said cassette from said channel upon release of said latching means.

2. A cassette tape holder as set forth in claim 1 wherein said grasping means are slidably supported on said frame and includes biasing means for biasing said grasping means into a forward position whereby a cassette grasped by said arm members is moved outwardly with respect to said channel so as to project partially outwardly of said housing thereby facilitating removal of said cassette from said channel.

3. A cassette tape holder as set forth in claim 2 wherein said biasing means comprises a coil spring and said frame includes a seat against which said spring acts to bias said grasping means forwardly and said housing includes guide means for guiding and retaining said spring.

4. A cassette tape holder as set forth in claim 3 wherein said guide means also operate to guide movement of said grasping means.

5. A cassette tape holder as set forth in claim 1 wherein said latching means comprise a release lever member projecting through an opening in said housing, said release lever being operable to move said portion out of said channel.

6. A cassette tape holder as set forth in claim 5 wherein said latching means are pivotably supported on said frame in side by side relationship by a common pivot rod.

7. A cassette tape holder as set forth in claim 5 further comprising biasing means for biasing said portion of said latch means into said channel.

8. A cassette tape holder as set forth in claim 7 wherein said biasing means comprises a spring member secured to said frame, said spring member having a plurality of spring fingers, each of said spring fingers acting on one of said latching means.

9. A cassette tape holder as set forth in claim 1 wherein said means defining said channels comprise integrally formed flange members, each of said flange members having protrusions extending along an outer edge thereof so as to define a pair of opposed shoulders projecting into said channel, said shoulders being operative to engage and support a cassette positioned within said channel.

10. A cassette tape holder as set forth in claim 1 wherein said grasping means includes a portion engaging an inner end portion of said cassette and is operative to effect partial outward movement of said cassette upon release of said latching means.

11. A cassette tape holder as set forth in claim 1 wherein said grasping means includes biasing means operative to urge said grasping means in a direction to effect said partial outward movement of said cassette, movement of said cassette into said channel being operative to effect movement of said grasping means to thereby compress said biasing means.

* * * * *

UNITED STATES PATENT AND TRADEMARK OFFICE
CERTIFICATE OF CORRECTION

PATENT NO. : 4,690,278

DATED : September 1, 1987

INVENTOR(S) : Yuki Uchiyama

It is certified that error appears in the above-identified patent and that said Letters Patent is hereby corrected as shown below:

ON THE TITLE PAGE, under "U.S. Patent Documents", insert the following references:

---4,231,625  11/1980  Perez et al---
---4,111,502   9/1978  Kessler---
---4,368,934   1/1983  Somers---
---4,339,162   7/1982  Gelardi et al---
---4,327,952   5/1982  Cournoyer et al---
---4,285,557   8/1981  Paladino et al---
---4,265,369   5/1981  Aboussouan---
---4,121,877  10/1978  Brown---
---3,885,670   5/1975  Cousino---

Column 1, line 26, "Whiel" should be ---While---.

Column 1, line 31, "diffcult" should be ---difficult---.

Column 1, line 53, "or" should be ---of---.

Column 1, line 56, "storge" should be ---storage---.

Column 1, line 64, "pushbuttom" should be ---pushbutton---.

Column 2, lines 33-34, "accordnce" should be ---accordance---.

Column 2, line 40, "campirses" should be ---comprises---.

Column 2, line 57, "interposes" should be ---interposed---.

UNITED STATES PATENT AND TRADEMARK OFFICE
CERTIFICATE OF CORRECTION

PATENT NO. : 4,690,278

DATED : September 1, 1987

INVENTOR(S) : Yuki Uchiyama

It is certified that error appears in the above-identified patent and that said Letters Patent is hereby corrected as shown below:

Column 2, line 58, "in" should be --to--.

Column 2, line 64, "compriss" should be --comprises--.

Column 3, line 51, "lockng" should be --locking--.

Column 4, line 17, "cushin" should be --cushion--.

Column 4, line 18, "grapsing" should be --grasping--.

Column 4, line 49, "facggn" should be --facing--.

Column 5, line 4, "56t o" should be --56 to--.

Column 6, line 16, Claim 4, "operate" should be --operates--.

Column 6, line 48, Claim 11, "1" should be --10--.

Signed and Sealed this

Twelfth Day of April, 1988

*Attest:*

DONALD J. QUIGG

*Attesting Officer*  *Commissioner of Patents and Trademarks*